United States Patent
Bosch et al.

(10) Patent No.: US 6,271,849 B1
(45) Date of Patent: Aug. 7, 2001

(54) SYSTEM AND METHOD FOR PRODUCING EXTERNALLY RENDERED OBJECT

(75) Inventors: Augusto Op Den Bosch, Duluth; Adrian Ferrier, Avondale Estates, both of GA (US)

(73) Assignee: Spectra Precision Software, Inc., Atlanta, GA (US)

(*) Notice: Subject to any disclaimer, the term of this patent is extended or adjusted under 35 U.S.C. 154(b) by 0 days.

(21) Appl. No.: 09/421,831

(22) Filed: Oct. 20, 1999

Related U.S. Application Data (60) Provisional application No. 60/105,114, filed on Oct. 21, 1998.

(51) Int. Cl.$^7$ ............................................ G06T 17/00
(52) U.S. Cl. ............................................ 345/419; 345/427
(58) Field of Search .................... 345/473, 418, 345/419, 425, 427, 433

(56) References Cited

U.S. PATENT DOCUMENTS 5,734,805 * 3/1998 Isensee et al. ................ 345/419
5,739,827 * 4/1998 Nagano et al. ............... 345/473

FOREIGN PATENT DOCUMENTS 0 674 974 A1  2/1995  (EP).

OTHER PUBLICATIONS

"Distributed Virtual Environments and VRML: an Event-based Architecture", Computer Networks and ISDN Systems 30(1998) 43–51, by Mike Wray and Rycharde Hawkes.

"Building Open Worlds (TM)", VRML 98 Monterey CAUSA, pp. 33–38 by Paul J. Diefenbach, Prakash Mahesh and Daniel Hunt, Feb. 16, 1998.

"Dynamic Class Loading in the Java Virtual Machine", OOPSLA, pp. 36–44, Oct. 1998 by Sheng Liang and Gilad Bracha.

"Web–Based Tele–Operated Systems Using EAI", IEEE 1997, pp. 749–754, Dec. 10, 1997 by Edward D. Elliott, Roy Eagleson.

* cited by examiner

*Primary Examiner*—Cliff N. Vo
(74) *Attorney, Agent, or Firm*—Morris, Manning & Martin, L.L.P.

(57) ABSTRACT

The invented system and method provide the capability to permit user-defined objects to be displayed in a virtual environment application (VEA). An externally-rendered object (ERO) includes at least one graphic instruction defining an object. The ERO is dynamically linked to the VEA so that the ERO can be rendered in the VEA preferably along with a virtual environment generated by the VEA. The ERO thus provides the user with the capability to customize the VEA without changing the source code thereof, and without using a complicated communication protocol between the VEA and ERO that would otherwise be required. The ERO can be used in a wide range of specific implementations. For example, the ERO can represent a remotely operated vehicle (ROV) operating in a virtual environment representing undersea topography. The ERO could also represent a drill operating in an undersea environment for oil exploration, for example.

72 Claims, 10 Drawing Sheets

Fig. 10

SYSTEM AND METHOD FOR PRODUCING EXTERNALLY RENDERED OBJECT

CROSS REFERENCE TO RELATED APPLICATIONS

This application claims the earlier filing benefits of U.S. Provisional Application No. 60/105,114 filed Oct. 21, 1998 naming Augusto Op Den Bosch and Adrian Ferrier as inventors.

FIELD OF THE INVENTION

This invention relates generally to a system and method for generating a graphical view using a computer, and more particularly, to generating a graphical view by cooperation of two or more different application programs or applets.

BACKGROUND OF THE INVENTION

Computer programs that render graphical views of a virtual environment on a computer display are well known. A program that generates a virtual environment, that is, a two- or three-dimensional environment in which a user is free to "move" by control of input devices, for example, is sometimes called a virtual environment application (VEA). VEAs have wide range applications, including the video gaming industry, modeling of natural phenomenon or occurrences such as volcanic activity or oil or chemical spills, or permitting prospective homebuyers or architects to wander through a house before the house is even constructed, for example. The powerful capabilities of VEAs have received considerable attention from software developers and consumers in recent years.

Often, a user has a specific need to display an object that cannot be generalized in an off-the-shelf VEA. There has therefore been considerable effort and numerous attempts in recent years to provide users with "customizable" VEAs. These high-level libraries, toolkits, or applications are used in conjunction with graphic libraries such as OpenGL® in order to facilitate the creation of custom objects within the VEAs.

Typically, the task of defining the objects that perform in a virtual environment can be divided into two categories. Specifically, one must define the object's appearance (i.e., geometry) and behavior (i.e., position and orientation of the object over time). Typically, object appearance is defined outside of the VEA through the use of a variety of geometric formats such as VRML, DXF, and the 3D Studio® format, in their corresponding editors. The definition of behavior, however, is more complex as it has no commonly accepted format within the graphics software industry.

One approach to capturing object behavior is to directly code instructions defining the behavior into the VEA. The problem with this approach is that any extension in the set of object behaviors will involve updating the source code of the VEA, a very complex task. An alternative approach is to use relatively complex communication protocols to allow an external application (i.e., simulation engine) to transmit an object's state information to a VEA for rendering in a graphical view. This approach is also problematic because general object behavior tends to be too complex for a description protocol to fully capture it. In addition, VEA and object parser development are complicated by the many required rules of a rich protocol. Accordingly, implementing simple objects is hindered by the large required protocol set and the implementation of complex objects is hindered by limitations in statically defined behaviors.

Additional scenarios exist in which the geometry of virtual objects is driven by behavior. If geometry is altered due to behavior, the updating of the source code or a rich protocol fails to perform adequately. Objects with dynamic geometry (e.g., waving flags, altered ground surfaces, and running water) are typically handled as special cases that end up breaking the code or raising special exceptions in a protocol. It would be desirable to provide a system and method which can define both appearance and behavior of an object separate and apart from object definitions of a graphics application program, to permit a user to define objects rendered in a graphical view without resorting to direct coding of the object in the VEA or a complex communication protocol.

SUMMARY OF THE INVENTION

The invented system and method overcome the above-noted disadvantages, and attain the objects set forth below. A system in accordance with the invention includes a computer having a processor, a memory, an input device, and a display coupled to the processor. The processor runs a virtual environment application (VEA) that is dynamically linked to an externally-rendered object (ERO) in the processor's memory. The processor renders the ERO in the VEA to generate a graphical view of at least the ERO on the display. The ERO can be inert, in which case the processor does not update the ERO as it runs the VEA. Alternatively, the ERO can be self-generating, in which case the ERO registers predetermined update period data with the VEA before operation of the ERO. In operation, the self-generating VEA tracks the time from the previous rendering cycle to determine whether the predetermined update period has elapsed. If so, the ERO alters itself to update the graphical view generated on the display. In yet another alternative, the ERO can be controlled by an external device that is a separate element from the VEA system. The external device can be coupled to the processor, optionally via a communication link, and interfaces with the ERO. If triggered to do so by the external device, the controlled ERO generates an update request supplied to the VEA to cause the VEA to update the graphical view generated by the VEA object data and the ERO data.

A method in accordance with this invention includes running a virtual environment application (VEA) program, dynamically linking the VEA to at least one externally-rendered object (ERO), and rendering the ERO in the VEA to generate a graphical view on a display. By dynamically linking the ERO to the VEA, the ERO can render itself on the display without the need for changing the VEA's code or providing a complex communication protocol between the VEA and the ERO. The ERO can thus be coupled as a module to the VEA in a manner that greatly simplifies the rendering of the ERO compared to alternative techniques.

An object of the invention is to provide an ERO that can be programmed externally to a VEA so that the source code of the VEA need not be reprogrammed to accommodate the ERO.

Another object of the invention is to provide an ERO whose appearance and behavior can be defined without the need for a complicated protocol to communicate state information between the ERO and VEA.

A further object of the invention is to provide the capability to render custom user-defined objects simply and economically by using transformation and rendering capabilities of standard VEA graphics applications.

Still another object of the invention is to remotely control the ERO to generate a graphical view on a display that can be used remotely to monitor an external device such as an undersea exploration vehicle or drill.

These together with other objects and advantages, which will become subsequently apparent, reside in the details of construction and operation as more fully hereinafter described and claimed, reference being made to the accompanying drawings, forming a part hereof, wherein like numerals refer to like parts throughout the several views.

DETAILED DESCRIPTION OF THE INVENTION

As used herein, the following terms have the following definitions:

"ERO" is the acronym of "externally-rendered object" and refers to an object defined by instructions outside of a virtual environment application (VEA) in which the ERO is rendered.

"ERO data" is object data of an ERO, which can be used to generate a graphical representation.

"External data" refers to data generated by an external device such as a controller or sensor.

"Input data" refers to data generated by an input device.

"Object data" refers to data defining an object and includes at least one graphic instruction that can define a parameter such as the shape, color, shading, fill, orientation, or motion or change in shape, color, shading, fill, or other graphic features.

"Rendering cycle" refers to the cycle used by the processor to update the object data, and to generate a graphical view with the object data.

"Render" means processing graphics instructions to generate object data for use in generating a graphical view of the object on the display.

"ROV" is the acronym for "remotely operated vehicle".

"Transformation data" refers to data used to transform objects by projection parameters that indicate how the graphical view is projected on the computer display, and by viewing parameters that indicate from what point and in which direction the virtual environment is to be viewed.

"Update" refers to changing an object's data in response to input data.

"Update period" refers to the period at which an object in a graphical view is updated by executing graphical instructions defining the object to redraw and/or repaint the ERO.

"VEA" is the acronym of "virtual environment application" and refers to an application program that renders a virtual environment, such as a software package commercially-available under the trademark TerraVista® from Spectra Precision Software, Inc. of Atlanta, Ga.

Figure 1:
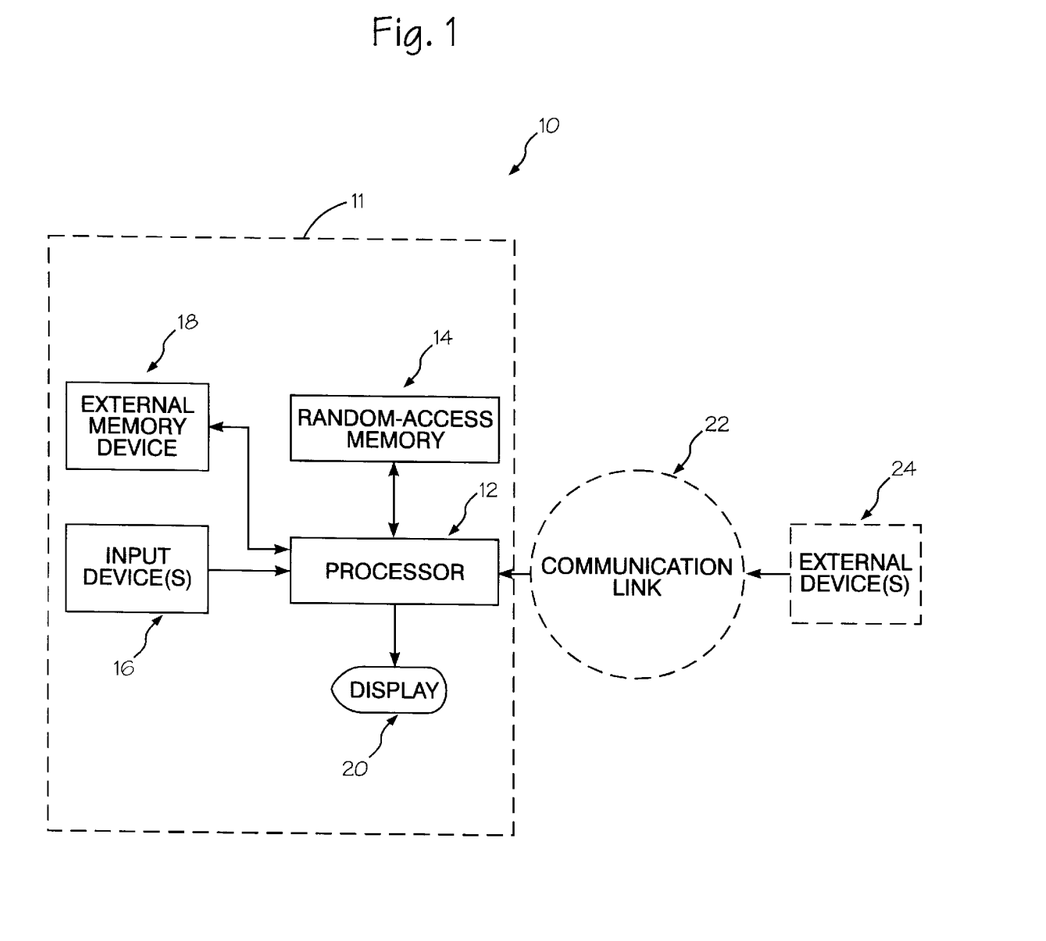
FIG. 1 is a block diagram of a system of the present invention which can be used to render an externally-rendered object (ERO) in a virtual environment generated by a virtual environment application (VEA)

In FIG. 1, a system 10 of this invention is shown. The system 10 includes a computer 11 with processor 12, a random-access memory (RAM) 14, an input device(s) 16, an external memory device 18, and a display 20. The external memory device 18 can be a hard disk drive, for example, and stores a virtual environment application (VEA) and an externally-rendered object (ERO). The processor 12 can be a commercially-available microprocessor, preferably a relatively high-speed variety configured for graphic applications, such as a Pentium II® or Pentium III® microprocessor operating at 333 Megahertz or higher. The processor 12 is coupled to the input device(s) 16. In response to input data generated by the user's manipulation of the input device(s) 16, the processor 12 loads the VEA and ERO stored in the external memory device 18 into the RAM 14. To accommodate the VEA and ERO and relatively large data matrices that can be generated by the processor 12, the RAM 14 is preferably relatively large, on the order of several tens or hundreds of megabytes or more. The VEA and ERO should of course be compatible applications. For example, if the VEA renders a graphical view as an OpenGL® window, the ERO should be capable of executing OpenGL® graphic instructions. The processor 12 executes the VEA stored in the RAM 14. Based on the processor's execution of a corresponding instruction in the VEA, or upon the user's manipulating the input device(s) 16 to generate input data so indicating, the processor 12 dynamically links the ERO to the VEA as the processor is executing the VEA. The processor 12 can in effect link the ERO to the VEA as a dynamically linked library. In addition, the VEA can be such as to permit a plurality of EROs to be dynamically linked to the VEA. To track the EROs and their addresses, the VEA can include a list in which the ERO identities and respective address are recorded so that the processor 12 can call a particular ERO(s) if the VEA's instructions indicate the processor should do so. As the processor 12 executes the VEA, the processor generates transformation data that represents the projection and viewing parameter data defining how the graphical view of the virtual environment is to be rendered. Typical projection parameter data includes perspective and/or orthographic data to control the manner in which the graphical view data is generated by the processor 12. The transformation data can also include data pertaining to the point and direction in which the virtual environment is to be viewed in rendering the graphical view containing the ERO. The projection and viewing data can be obtained and stored as respective or combined data matrices in the RAM 14. Furthermore, the processor 12 executes the VEA until a call instruction in the VEA causes control to pass to the ERO, in which case the processor 12 executes the ERO's graphic instructions to generate ERO data defining the ERO's appearance, location and orientation. More specifically, the ERO data can include the ERO's appearance, i.e., shape, color, fill, line character, as well as position and orientation data defining how the ERO moves or changes over time, and other data. After executing the ERO code to generate the ERO data, control passes to the VEA and the processor 12 executes graphic instructions to render the ERO. More specifically, the processor 12 executes the VEA to render graphical view data of the ERO. The graphical view data can be supplied from the VEA to the display 20 to generate the graphical view. The display 20 can be a cathode ray tube (CRT), a flat-panel display, or other device.

The user can generate input data by manipulation of the input device(s) 16. Such input device(s) can include a unit such as a keyboard, mouse, spaceball, joystick, or other device. For example, the input data could be input via the processor 12 into the VEA stored in the RAM 14 using projection parameter data affecting the manner in which the virtual environment is rendered by the VEA. Such input data could also be supplied via the input device(s) 16 and the processor 12 into the RAM 14 to define the point and direction in which the virtual environment is to be viewed upon rendering the graphical view of such environment with the VEA. Such input data could also be supplied via the input device(s) 16 and processor 12 into the ERO code in the memory 14 to impact generation of the ERO data, i.e., the appearance or behavior of the ERO data. In addition, the input data can be used to generate VEA object data supplied to the processor 12 for loading into VEA in the RAM 14 to permit the user to custom-define properties of one or more VEA objects.

Certain interaction between the VEA and ERO(s) may be required to initialize the ERO(s) to the VEA. For example, the processor 12 can execute the VEA to call a function of the ERO that causes the ERO to generate a dialog box on the display 20 to permit the user to input data such as a predetermined maximum update rate of the ERO. The processor 12 can also be programmed via the VEA to call a function that causes the ERO to accept predetermined offset data indicative of the translation required to position the ERO in the graphical view of the virtual environment generated by the VEA. The VEA can also call a function of the ERO to cause the ERO to supply to the VEA data indicative of the predetermined update scheme required by the ERO. Such update scheme data can indicate that the ERO is inert and that therefore, once rendered, the ERO data requires no updating. Alternatively, the ERO can be a self-generating ERO that requires update at a predetermined period. In this case, in response to the VEA's calling the ERO's update scheme function, the ERO returns a predetermined update period that is the minimum expected for that ERO. If more than one ERO is dynamically linked to the VEA, the VEA is required to compare the update period from all such EROs to determine the smallest which corresponds to the ERO that requires the fastest update rate. The VEA then generates and calls an update function periodically using the smallest ERO update period to all EROs dynamically linked to the VEA. In response to the function called by the VEA to identify the update scheme to be used by the ERO to update its object data, the ERO can also register with the VEA that the ERO will update its object data if the ERO generates a request to the VEA to do so. This update scheme is used for the controlled ERO in which the ERO's data depends upon data generated by the external device(s) 16. For example, an external device such as the controller or sensor of a remotely operated vehicle (ROV) operating in remote environments, for example, deep undersea could generate the data. The ERO determines if the ROV's data has been updated. If so, the ERO generates and sends the VEA a request to update the ERO data. The VEA can also initialize the ERO by calling a function causing the ERO to initialize communications between the ERO and the external device in a manner that can be the same or similar to that between the VEA and the ERO.

To render the ERO in a graphical view generated on the display 20 by the processor 12 in running the VEA, the VEA can call a drawing and/or painting function of the ERO to cause the ERO to render itself by generation of ERO data. The ERO can provide access to the ERO data by writing message into a predetermined memory space checked periodically by the VEA to determine if the ERO data is ready to be read for use in rendering the graphical view. The VEA uses the transformation data to transform the ERO data into data of a form suitable for generating the graphical view on the display 20. The VEA can optionally call an update function of the ERO, in response to which the ERO can indicate to the VEA whether the ERO will update itself on the current rendering cycle. The VEA can also call a function to cause the ERO to supply the ERO transformation data to the VEA. The ERO transformation data should be suitable to translate the ERO data from ERO space to VEA space. The VEA can also call a function to set the ERO transformation data in the ERO. Furthermore, the VEA can call a function of the ERO to cause the ERO to supply the VEA with the parameters of a bounding volume, a sphere for example, which encloses the ERO. The VEA uses such envelope data to reduce the amount of graphical view data it is required to update to render the current ERO data. The envelope data can also be used by the VEA to ensure that the ERO object is not be cut-off in the graphical view generated by the ERO data. In addition to its surface definition, the envelope data can also include the position and orientation of such envelope surface.

Figure 2:
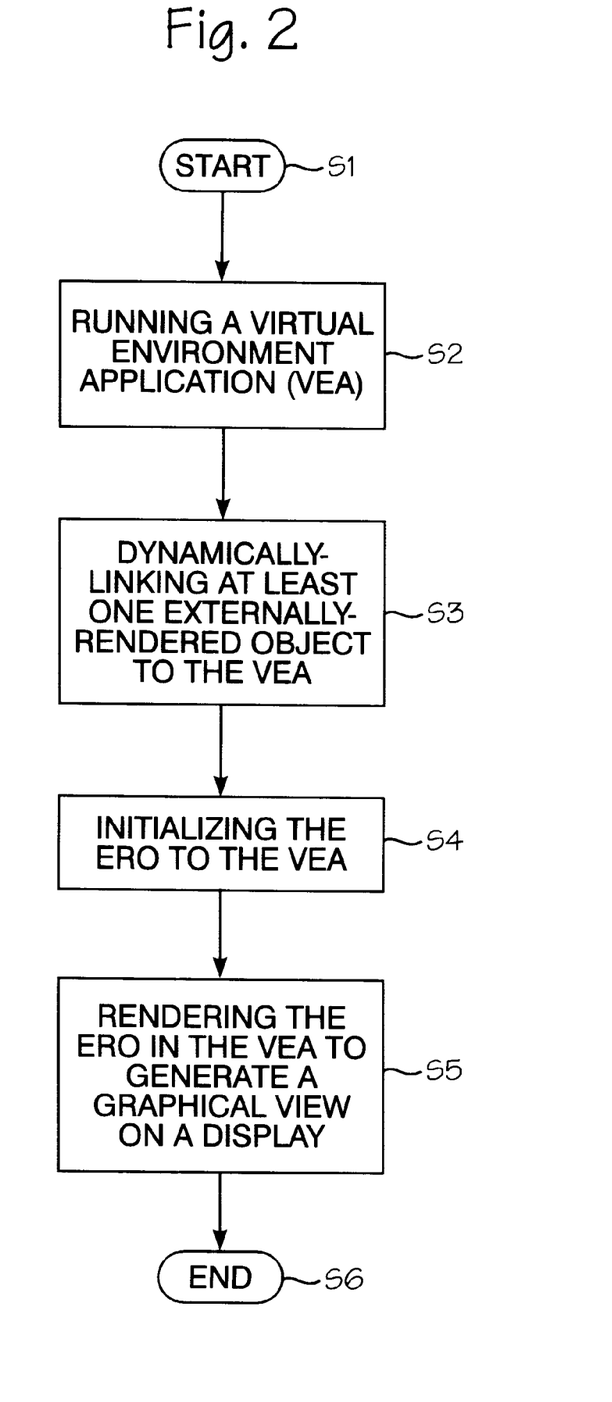
FIG. 2 is a basic flowchart of a method of the invention.

FIG. 2 is a flowchart of a method in accordance with this invention. In step S1, the method of FIG. 2 begins. In step S2, the method includes running a virtual environment application (VEA). For example, the VEA can be stored in the RAM 14 and run by the processor 12. The method also includes a step S3 of dynamically linking at least one object to the VEA. Such step can be performed by the processor by linking the ERO to the VEA as a dynamically linked library. Step S4 of FIG. 2 includes a step of initializing the ERO to the VEA. The initialization step can involve setting user-specified parameters of the ERO, setting an offset used to translate the ERO from ERO space to VEA rendering space, registering an update scheme to be used by the ERO to update itself, and other parameters. In step S5, the VEA renders the ERO to generate a graphical view on the display 20. More specifically, the processor 12 uses transformation data from the RAM 14, VEA object data if rendered, and the ERO data, to generate the graphical view on the display 20. In step S6, the method of FIG. 2 ends.

Figure 3:
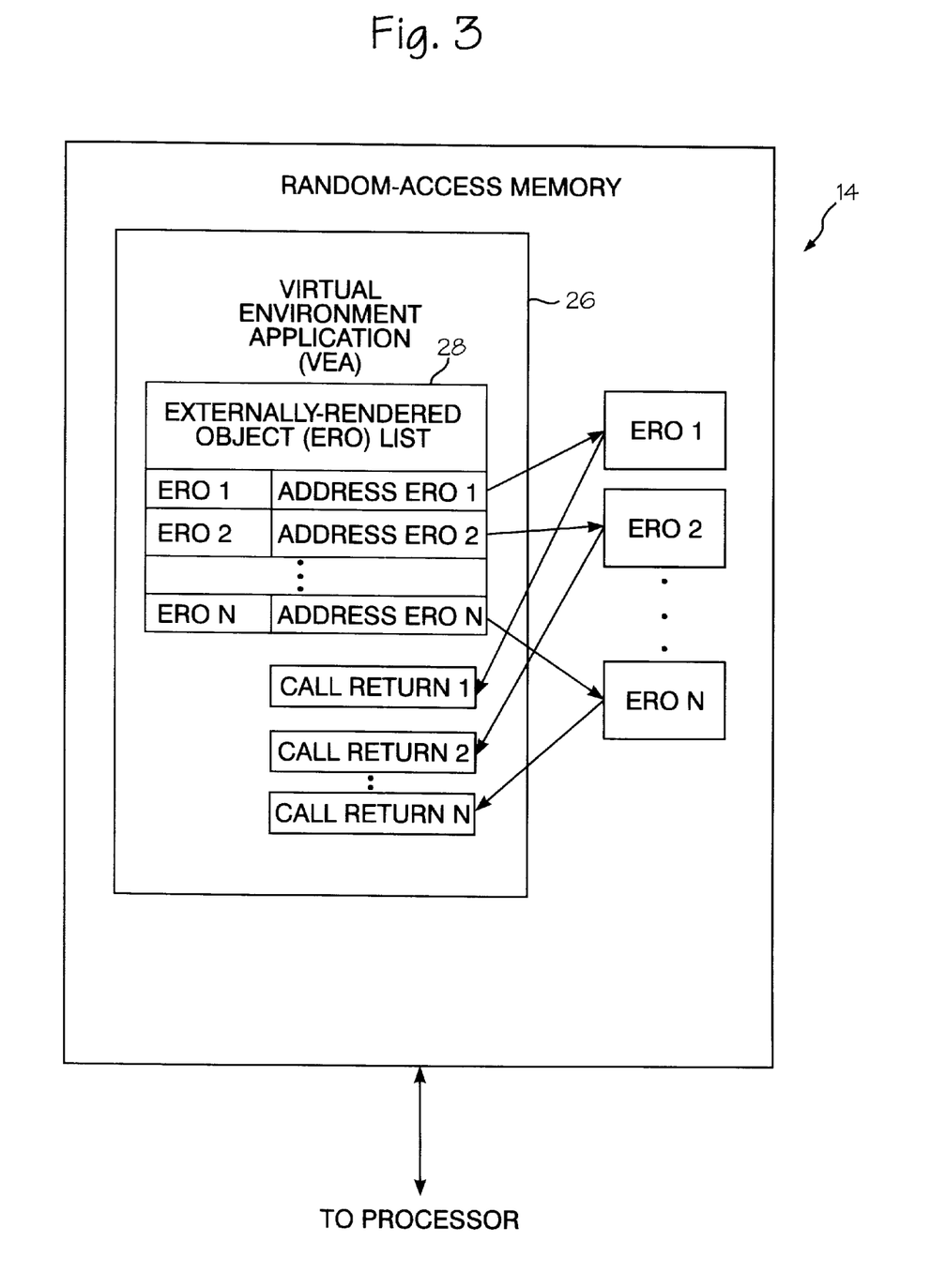
FIG. 3 is a schematic view of an ERO list recorded and maintained in the system's memory via the processor.

FIG. 3 is a schematic diagram of a memory map of the RAM 14. The RAM 14 is loaded with the VEA 26, and various EROs specifically identified as ERO1, ERO2, through ERON. The EROs are dynamically linked to the VEA 26 as the processor 12 executes the VEA. The VEA 26 includes an ERO list including ERO identity data uniquely identifying the corresponding ERO recorded in association with the respective memory address for such ERO. The VEA uses the data list to call specific EROs. For example, the VEA can use the address list to call address ERO1 to cause the processor 12 to pass control to the ERO1. The ERO1 can perform one or more functions as dictated by its code, and the ERO1 subsequently calls Call Return 1 to return control to the VEA. Similar actions can be performed by the processor 12 by using address ERO2 through ERON.

Figure 4:
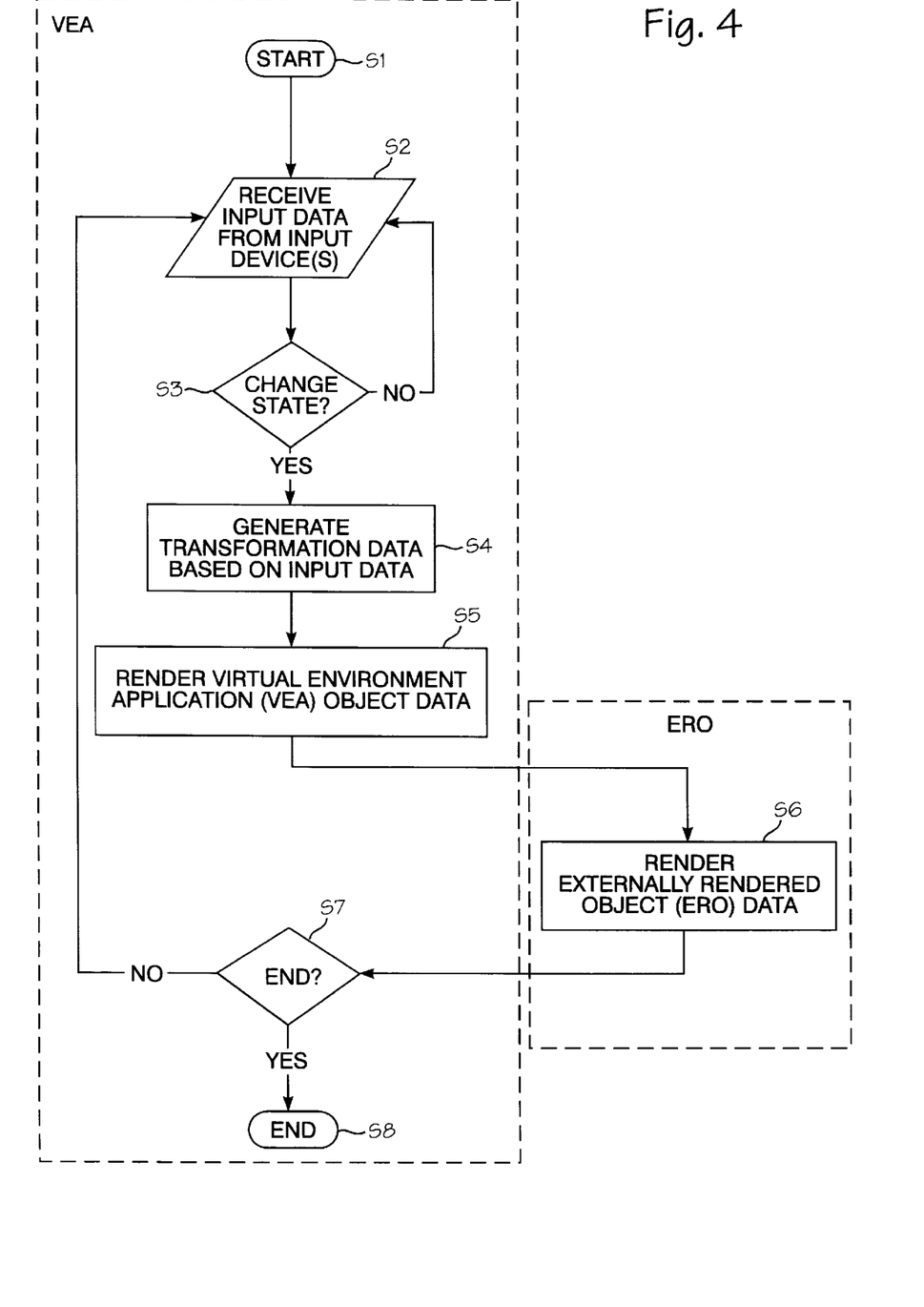
FIG. 4 is a flow chart of processing of the VEA and ERO via the processor in the case of an inert ERO.

FIG. 4 is a flowchart of a method for rendering ERO data in a case in which the ERO is inert. The processing of FIG.

4 can be performed by the processor 12 by executing the VEA and dynamically linked ERO stored in the RAM 14. In step S1, the processing of FIG. 4 begins. In step S2, the processor 12 receives input data from input device(s) 16. In step S3, the processor 12 determines whether the input data has changed. If not, the processor 12 repeats step S2. On the other hand, if in step S3 the input data has changed, in step S4, the processor 12 generates transformation data based on the input data. In step S5, the processor 12 generates VEA object data based on the input data and the transformation data. In step S6, control is passed from the VEA to the ERO and the processor 12 generates ERO data based on the input data and the transformation data. The graphical view can be generated as steps S5 and S6 are performed by supplying the VEA object data and the ERO data from the RAM 14 to the display 20 to generate a graphical view containing the VEA object(s) and ERO. Alternatively, the VEA object data and ERO data resulting from performance of steps S5 and S6 can be recorded in a first of two display buffers in the RAM 14. The second buffer supplies VEA object data and ERO data from the previous rendering cycle to the display 20. After performance of step S6, the first buffer in which the VEA object data and the ERO data for the current rendering cycle are recorded and the second buffer used to supply VEA object and ERO data from the previous rendering cycle are switched. As a result, the VEA object data and ERO data from the current rendering cycle are supplied to the display 20 to generate a graphical view. The second buffer is then used to receive VEA object data and ERO data for the next rendering cycle. The buffers are alternated or swapped in this manner at the conclusion of each rendering cycle to update the graphical view on the display. Such technique is referred to hereinafter as "buffer swapping." In step S7, the processor 12 performs a determination to establish whether the processing of FIG. 4 has been terminated. Such determination could be made based on user input data. If the determination in step S7 is negative, the processor 12 repeats step S2. On the other hand, if the determination in step S7 is affirmative, the processing performed by the processor 12 in the performance of the method of FIG. 4 terminates in step S8.

Figure 5:
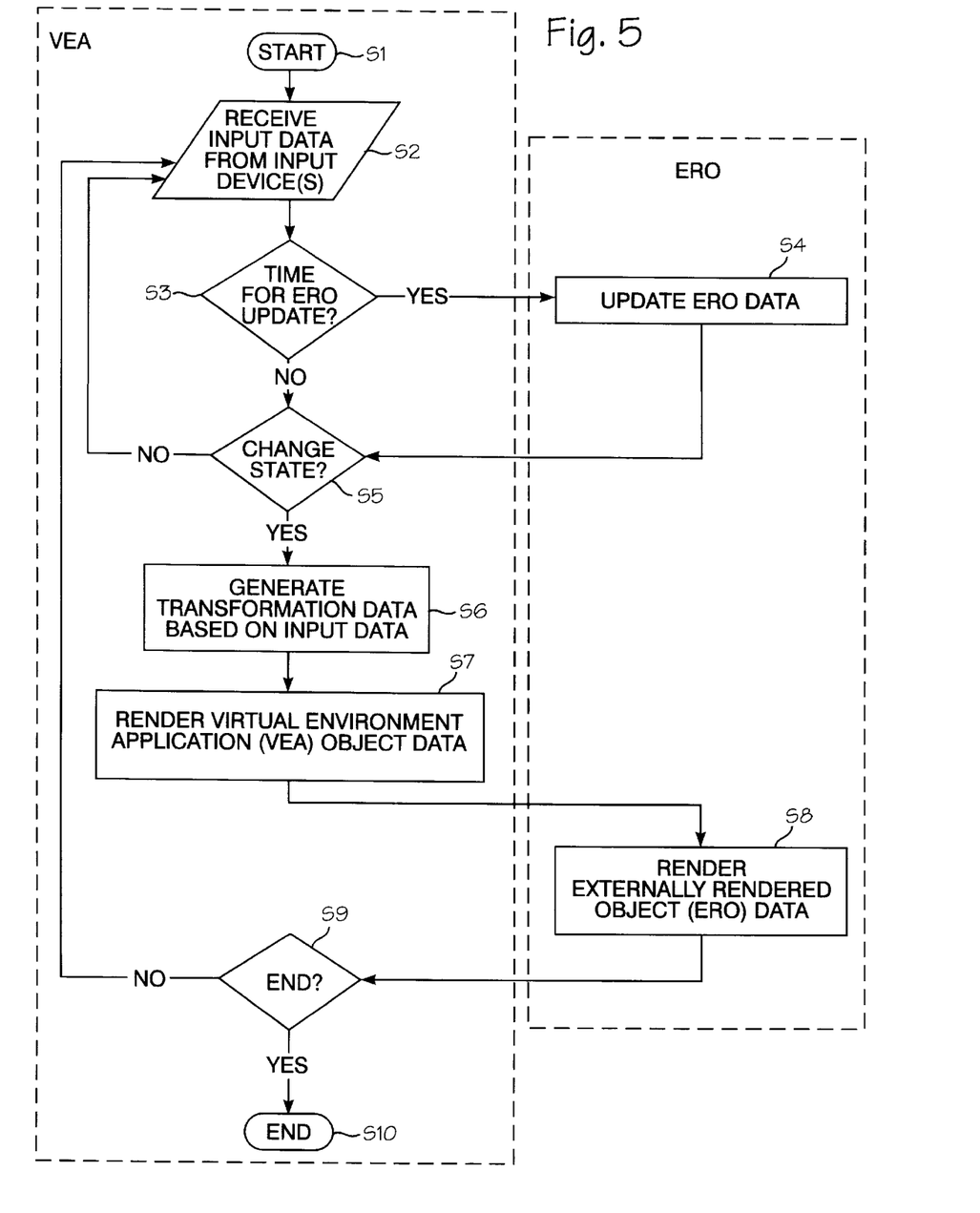
FIG. 5 is a flow chart of processing of the VEA and the ERO in the case of a self-generating ERO.

FIG. 5 is a flow chart of a method for rendering an ERO to generate a graphical view in a case in which the ERO is self-generating. In step SI, the method of FIG. 5 begins. In step S2 of FIG. 5, the processor 12 receives input data from the input device(s) 16. In step S3, the processor 12 determines whether the ERO requires an update. More specifically, the VEA can be initialized via the ERO with a pre-registered update period at which the ERO is to be updated. The processor 12 compares such update period with the update periods from all other EROs dynamically linked to the VEA. The processor 12 determines the ERO requiring the most frequent updating and selects the predetermined update period corresponding to this ERO for use as the update period to be used to track all EROs. In step S3, the VEA determines whether the predetermined update period starting from conclusion of the previous rendering cycle has terminated. If so, control passes from the VEA to the ERO and in step S4 the ERO updates its ERO data. After performance of step S4, control returns to step S5. In step S5, the processor 12 determines whether either the input data or the ERO data necessitate changing the VEA object data or ERO data. If not, the processor 12 repeats step S2. On the other hand, if the determination in step S5 is affirmative, in step S6, the processor 12 generates transformation data based on the input data. In step S7, the processor 12 renders updated virtual environment application (VEA) object data based on the input data and the transformation data. After performance of step S7, control passes from the VEA to the ERO and in step S8 the processor 12 executes the ERO instructions to render ERO data. The rendering of steps S8 and S9 can be performed so that the VEA object data and ERO data resulting from performance of such steps is supplied to the display 20 to generate a graphical view of the VEA object(s) and ERO data. Alternatively, the VEA object data and ERO data can be recorded and displayed using buffer swapping. After performance of step S8, control passes from the ERO to the VEA. In step S9, the VEA determines whether the processing of FIG. 5 is to be terminated by the processor 12. If not, the processor 12 repeats step S2 and subsequent steps. On the other hand, if the determination in step S9 is affirmative, the processor 12 terminates the processing of FIG. 5 in step S10.

Figure 6:
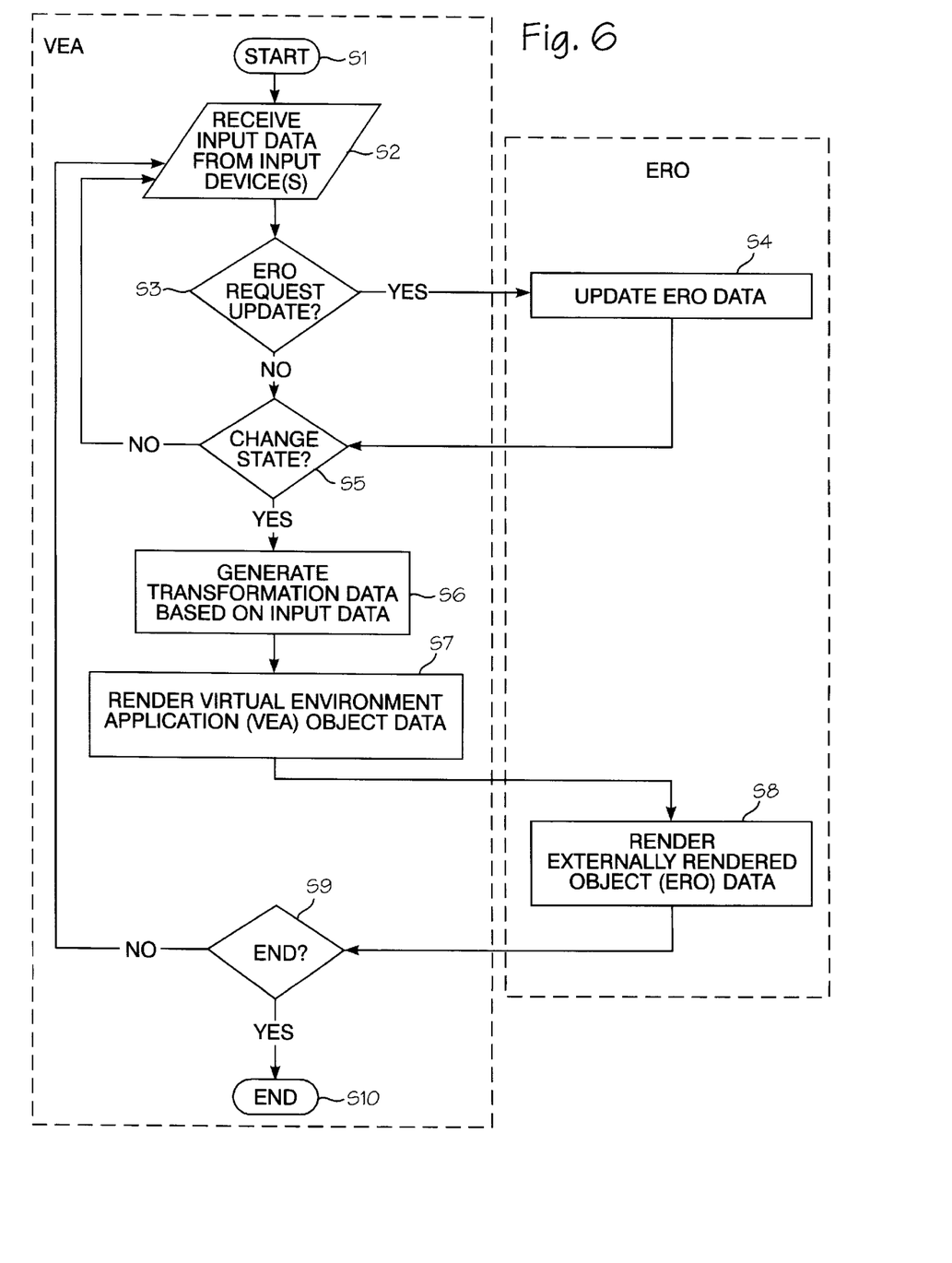
FIG. 6 is a flow chart of processing of the VEA and the ERO in the case of a controlled ERO.

FIG. 6 is a flow chart of processing performed by the processor 12 in the performance of a method in which the ERO is controlled. The ERO can be controlled by an external device(s) 24 coupled to the processor 12 via communication link 22. In step S2, the processor 12 receives input data from the input device(s) 16. In step S3, the VEA determines whether the ERO has requested an update. The ERO can indicate whether it requires an update by recording an update message in a predetermined memory space that is checked by the VEA in the performance of step S3 to determine whether the ERO data must be updated. If so, control is passed from the VEA to the ERO and the ERO updates its data in step S4. After performance of step S4, control passes back from the ERO to the VEA and in step S5 the processor 12 determines whether either the input data or the ERO data or both necessitate update of the graphical view in the display 20. If not, the processor 12 repeats the performance of step S2. On the other hand, if either the input data or the ERO data have changed state, the processor 12 proceeds to step S6 in which the processor 12 generates transformation data based on the input data. In step S7, the processor 12 renders VEA object data based on the input data and transformation data. Control passes from the VEA to the ERO and in step S8 the ERO renders the ERO object data. As previously explained, the processor 12 can perform steps S7 and S8 to generate a graphical view on the display 20 either as such steps are performed, or by recording the VEA object data and ERO data in buffers of the RAM 14 that are swapped after the data is recorded to generate an updated graphical view on the display 20. In step S9, the processor 12 determines whether the method of FIG. 6 is to be terminated. If not, the processor 12 repeats performance of step S2. On the other hand, if the determination in step S9 is affirmative, in step S10, processing performed by the processor 12 in the performance of the method of FIG. 6 ends in step S10.

Figure 7:
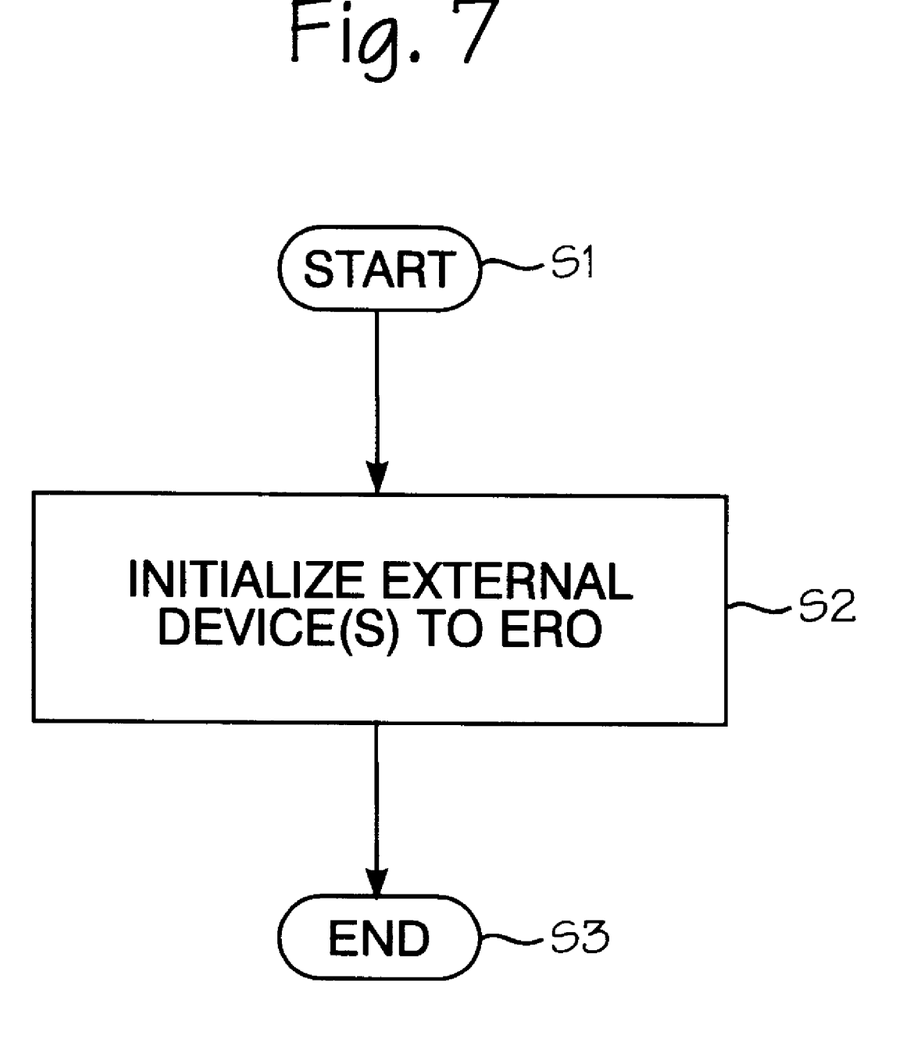
FIG. 7 is a flow chart of the initialization of an external device to the ERO.

Before the performance of the method of FIG. 6, the ERO can require initialization to an external device(s) 24 via communication link 22 to establish communication therewith to permit the ERO to render itself based on external data generated by such device(s). A method for initializing the ERO to the external device begins in step S1 of FIG. 7. In step S2, the ERO initializes the external device(s) 24 to itself. The initialization of the external device(s) 24 to the ERO can be performed in a manner similar to that used to initialize the ERO to the VEA. More specifically, the ERO can generate a dialog box to permit the user to input the maximum expected refresh rate of the external device, and an offset necessary to translate the data generated by the external device from the external device's space to the ERO space. The ERO can also call the external device(s) 24 to register a predetermined update scheme with the ERO. In step S3 of FIG. 7, the processing performed by the processor 12 to initialize the external device(s) to the ERO ends in step S3.

Figure 8:
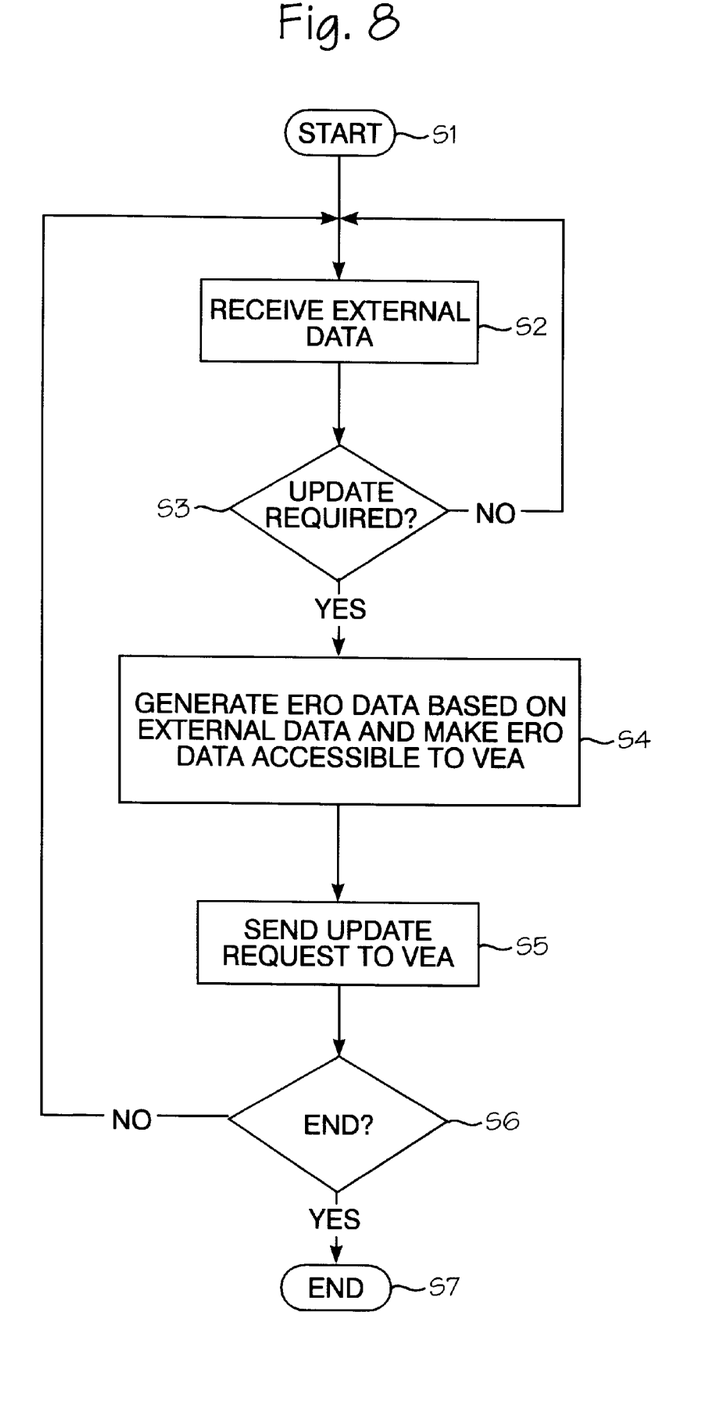
FIG. 8 is a flow chart of processing performed by the ERO in the case of the ERO being controlled by an external device.

FIG. 8 is a method of processing performed by the processor 12 to execute the instructions of a controlled ERO. The processing of FIG. 8 must be carried out by the processor 12 at least as often as the rendering cycle of FIG. 6 to ensure that ERO data is updated at a predetermined rate as desired by the user. The processing of FIG. 8 begins in step S1. In step S2, the processor 12 executes the ERO to receive external data generated by the external device(s) 24. The processor 12 can receive the external data via the communication link 22. In step S3, the processor 12 executes the ERO to determine whether the ERO data should be updated based on the external data. If the external data does not necessitate updating of the ERO data, the processor repeats step S2. On the other hand, if in step S3 update of the ERO data is determined to be necessary, in step S4, the processor 12 executes the ERO's instructions to generate ERO data at a memory location accessible to the VEA. In step S5, the processor 12 executes the ERO to send an update request to the VEA. The ERO can accomplish this task by writing a predetermined message into a memory space that the processor 12 will check periodically as the VEA is running. In step S6, the ERO determines whether the ERO's processing is to be terminated, such as by the user generating input data so indicating. If the determination of step S6 is negative, the processor 12 executes the ERO instructions to repeat step S2 and subsequent steps. On the other hand, if the determination in step S6 is affirmative, in step S7, the processing performed by the ERO in the performance of the method of FIG. 8 ends in step S7.

Figure 9:
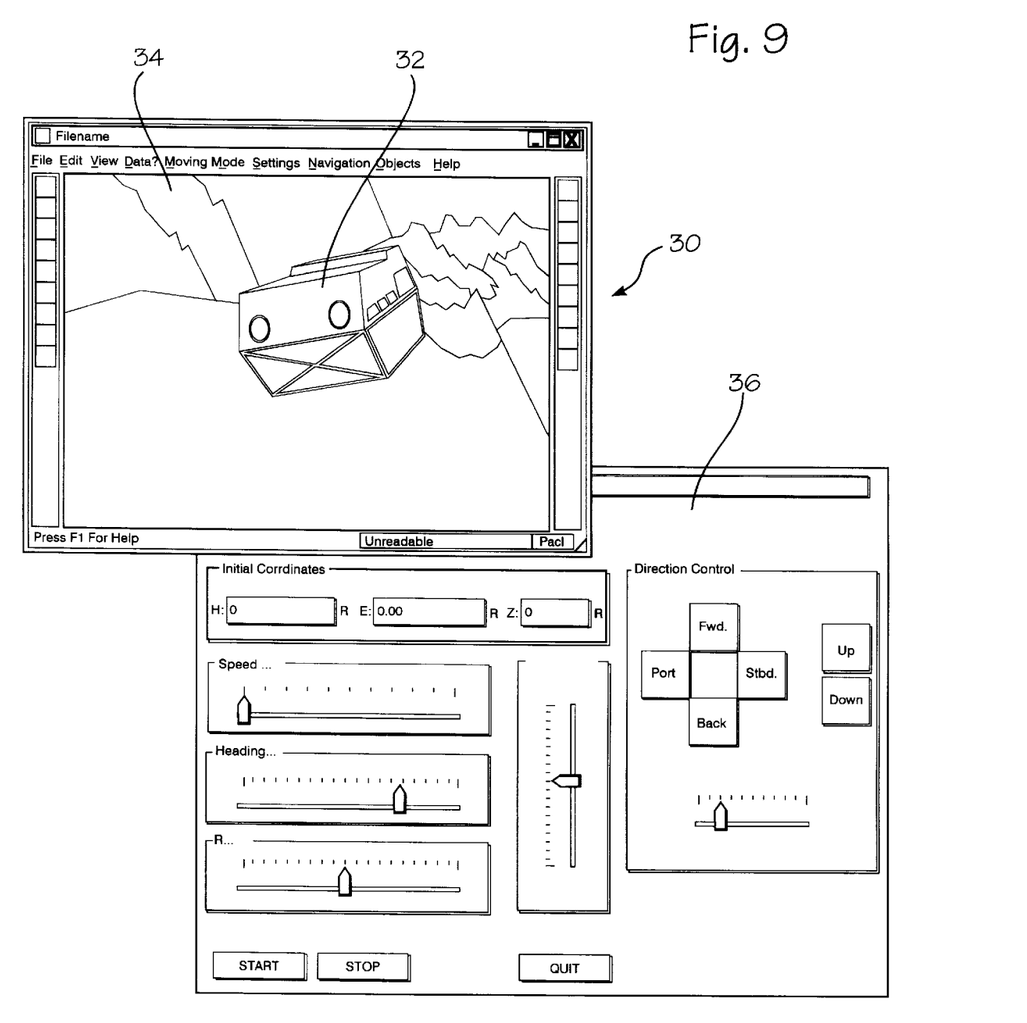
FIG. 9 is a screen display of an external object rendered by the system and method of the present invention.

FIG. 9 is an example of the system 10 and method of this invention as applied to a controlled ERO. FIG. 9 shows a graphical view 30 generated on display 20 by a graphical view data generated by the processor 12. A remotely operated vehicle (ROV) operating in a deep-sea environment controls the ERO 32. The remotely operated vehicle generates position and orientation data pertaining to the ROV and supplies such data as external data to the ERO 32 via communication link 22. The ERO 32 is rendered in a virtual environment 34 showing the contours of an undersea cliff face near which the ERO 32 is operated. The virtual environment 34 is generated by a VEA, in this case a graphic software package sold under the trademark TerraVista®, that is produced by Spectra Precision Software, Inc., Atlanta, Ga. The VEA is linked to the ERO via COM DLL code. The external device 24 also generates a dialog box 36 to permit the user to control the ROV.

Figure 10:
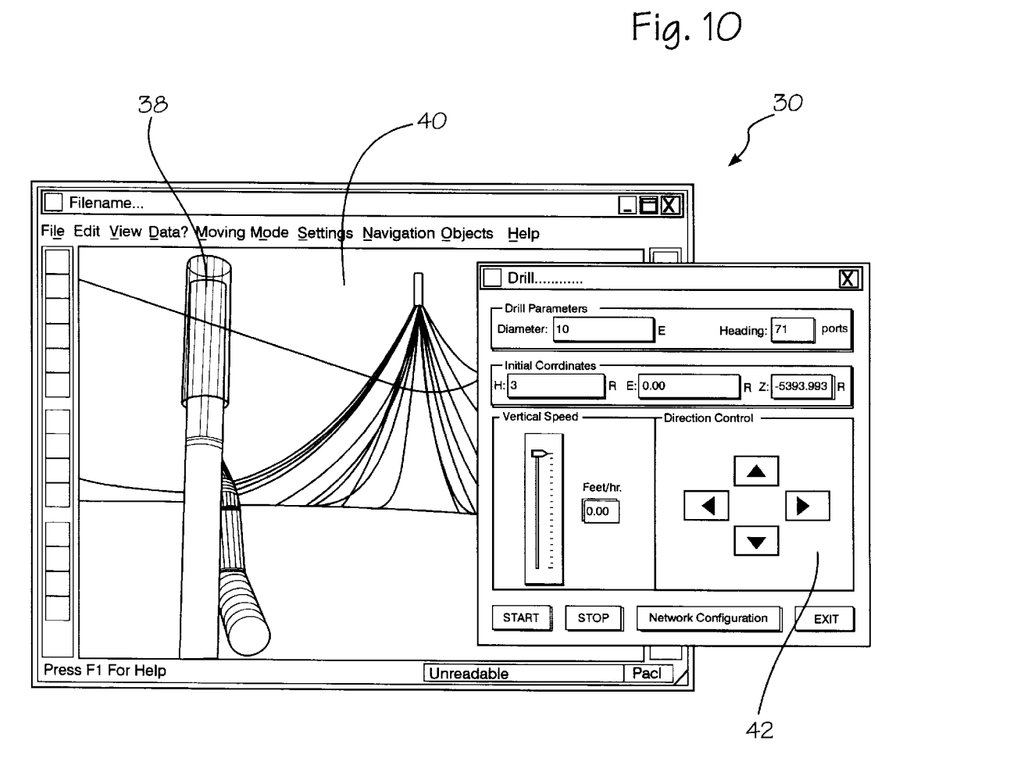
FIG. 10 is a screen display of an externally rendered object that corresponds to a sub-sea drill.

FIG. 10 is another example of the system 10 and method of this invention as applied to a controlled ERO. In the example of FIG. 10, the ERO 38 is a graphic representation of the core of earth produced by a drill as can be used in undersea oil exploration. The ERO 38 represents the various rock strata through which the drill is penetrating as it advances into the earth. The ERO 38 is rendered by the processor 12 in the virtual environment 40 generated by the VEA, which shows the position of the drill in such environment. The view 30 of FIG. 10 also indicates a dialog box 42 that permits the user to control the drill.

It should be appreciated that an ERO(s) can be dynamically unlinked from the VEA as well as dynamically linked thereto. Such linking or unlinking from the ERO can be controlled by user input data supplied to the processor 12 via the input device(s) 16. These capabilities provide a user with the capability to selectively add or remove an ERO from a graphical view as desired by the user, although such linking or unlinking can also be performed by execution of the VEA code without any user-specified request to do so.

The many features and advantages of the present invention are apparent from the detailed specification and it is intended by the appended claim to cover all such features and advantages of the described system and method which follow in the true scope and spirit of the invention. Further, since numerous modifications and changes will readily occur to those of ordinary skill in the art, it is not desired to limit the invention to the exact implementation and operation illustrated and described. Accordingly, all suitable modifications and equivalents may be resorted to as falling within the scope and spirit of the invention.

What is claimed is:

1. A method comprising the steps of:
   a) running a virtual environment application (VEA);
   b) dynamically linking at least one eternally-rendered-object (ERO) defining its own appearance and behavior, into the VEA; and
   c) rendering the ERO in the VEA to generate a graphical view of the ERO on a display, the graphical view presenting the appearance and independently of the VEA behavior of the ERO.

2. A method as claimed in claim 1, wherein the ERO includes at least one graphic instruction.

3. A method as claimed in claim 1, wherein the VEA includes at least one graphic instruction.

4. A method as claimed in claim 1, wherein said step (b) is performed in response to a user request.

5. A method as claimed in claim 1, wherein said step (b) is performed in response to at least one prerecorded instruction.

6. A method as claimed in claim 1, wherein said step (b) includes substeps of recording and maintaining in the VEA a list of EROs that have been loaded into the VEA.

7. A method as claimed in claim 1, wherein the VEA renders a graphical view that is compatible with rendering instructions used by the ERO.

8. A method as claimed in claim 7, wherein the VEA renders the graphical view as an OpenGL® window and the ERO executes OpenGL® graphic instructions.

9. A method as claimed in claim 1, wherein the VEA renders the graphical view in said step (c) with at least one projection parameter defined by a user.

10. A method as claimed in claim 9, wherein the projection parameter includes an orthographic parameter.

11. A method as claimed in claim 9, wherein the projection parameter includes a perspective parameter.

12. A method as claimed in claim 9, wherein the VEA renders the graphical view in said step (c) with at least one viewing parameter defined by a user.

13. A method as claimed in claim 9, wherein the VEA renders the graphical view in said step (c) with at least one custom object defined by a user.

14. A method as claimed in claim 1, wherein the VEA renders the graphical view in said step (c) with at least one projection parameter defined by a user.

15. A method as claimed in claim 1, wherein the VEA renders the graphical view in said step (c) with at least one viewing parameter defined by a user.

16. A method as claimed in claim 1, further comprising the step of:
   d) initializing the ERO with the VEA.

17. A method as claimed in claim 16, wherein said step (d) includes a substep of calling with the VEA a function of the ERO to cause the ERO to generate a dialog box on the display to permit the user to input predetermined data for rendering the ERO.

18. A method as claimed in claim 16, wherein said step (d) includes a substep of calling with the VEA a function to cause the ERO to generate a dialog box to permit the user to input a predetermined update period of the ERO, the ERO supplying the update period to the VEA.

19. A method as claimed in claim 16, wherein said step (d) includes a substep of calling with the VEA a function to cause the ERO to accept predetermined offset data indicative of the translation required to be used by the ERO to translate the ERO from ERO space to VEA rendering space.

20. A method as claimed in claim 16, wherein said step (d) includes a substep of calling with the VEA a function to allow the ERO to register a predetermined update scheme with the VEA.

21. A method as claimed in claim 20, wherein the ERO is inert and the predetermined update scheme registered with the VEA by the ERO is to request no update from the VEA.

22. A method as claimed in claim 20, wherein the ERO is self-generating and the predetermined update scheme registered with the VEA by the ERO makes a request to the VEA for update periodically.

23. A method as claimed in claim 20, wherein the ERO is controlled and the predetermined update scheme registered with the VEA by the ERO is to request update based on an event occurring externally to the VEA and the ERO.

24. A method as claimed in claim 23, wherein the event is generated by a remotely operated vehicle (ROV) at an interface to the ERO that is not shared by the VEA.

25. A method as claimed in claim 23, wherein said step (d) includes a substep of calling with the VEA a function of the ERO to cause the ERO to initialize an interface between the ERO and an external controller of the ERO.

26. A method as claimed in claim 23, wherein said step (c) includes a substep of calling at least one drawing function of the ERO to cause the ERO to generate ERO data for generating a graphical view of the ERO.

27. A method as claimed in claim 26, wherein said step (c) includes a substep of generating ERO data to alter the ERO's geometry and behavior.

28. A method as claimed in claim 27, wherein the VEA calls a function to cause the ERO to indicate to the VEA whether the ERO will update itself on the current update cycle.

29. A method as claimed in claim 27, wherein the VEA calls the function to cause the VEA to supply the bulk attitude data of the ERO transformation matrix data to the VEA.

30. A method as claimed in claim 27, wherein the VEA calls the function to set the bulk attitude transformation matrix in the ERO.

31. A method as claimed in claim 27, wherein said step (c) includes the substep of calling a function in the ERO to cause the ERO to supply the VEA with at least one clipping parameter of a sphere enclosing the ERO object.

32. A method as claimed in claim 31, wherein the clipping parameter includes clipping envelope data and the VEA uses the clipping envelope data to selectively update the graphical view.

33. A method as claimed in claim 32, wherein the clipping parameter includes the clipping envelope location data generated by the ERO to indicate the location of the ERO's clipping envelope in the graphical view.

34. A method as claimed in claim 32, wherein the clipping parameter includes the clipping envelope orientation data.

35. A method as claimed in claim 32, wherein said step (c) includes a substep of positioning the ERO based on position data accessible to the VEA.

36. A method as claimed in claim 27, wherein said step (c) includes a substep of orienting the ERO based on orientation data accessible to the VEA.

37. A method as claimed in claim 32, wherein the ERO is coupled to communicate with an external controller, and the ERO receives external data from the external controller used by the ERO to generate ERO data for generating a graphical view of the ERO.

38. A method as claimed in claim 32, wherein said step (b) is performed to link a plurality of EROs to the VEA.

39. A system comprising:
a computer having a processor coupled to a memory, an input device, and a display, the processor running a virtual environment application (VEA) dynamically linked to an externally-rendered object (ERO) defining its own appearance and behavior, the VEA and the ERO loaded into the memory, the processor rendering the VEA and ERO to generate a graphical view of at least the ERO on the display, the graphical view presenting the appearance and independently of the VEA behavior of the ERO.

40. A system as claimed in claim 39, wherein the system is operable by a user that manipulates the input device to generate input data supplied to the processor to cause the processor to load the ERO.

41. A system as claimed in claim 39, wherein the ERO is dynamically linked to the VEA by the processor's execution of prerecorded instructions in the memory.

42. A system as claimed in claim 39, wherein the VEA records and maintains a list of EROs in the memory that have been dynamically linked into the VEA.

43. A system as claimed in claim 39, wherein the processor executes the VEA to render the graphical view to be compatible with the predetermined rendering instructions of the ERO.

44. A system as claimed in claim 43, wherein the processor executes the VEA to render the graphical view in an OpenGL® window and the ERO executes OpenGL® graphic instructions.

45. A system as claimed in claim 39, wherein the user manipulates the input device to generate projection parameter data supplied to the VEA, and the graphical view is rendered by the VEA using the projection parameter data.

46. A system as claimed in claim 45, wherein the projection parameter data includes orthographic projection data.

47. A system as claimed in claim 45, wherein the projection parameter data includes perspective parameter data.

48. A system as claimed in claim 45, wherein the user manipulates the input device to generate viewing parameter data supplied to the VEA, and the graphical view is rendered using the viewing parameter data.

49. A system as claimed in claim 45, wherein the user manipulates the input device to supply a predetermined custom object to the VEA.

50. A system as claimed in claim 49, wherein the processor executes the VEA to initialize the ERO to the VEA.

51. A system as claimed in claim 50, wherein the processor executes the VEA to call a function of the ERO to generate a dialog box to permit the user to input at least one initialization parameter data to the ERO.

52. A system as claimed in claim 51, wherein the processor executes the VEA to call a function of the ERO, the processor executing the ERO to generate a dialog box to permit the user to input a predetermined minimum expected update period of the ERO, the ERO supplying the minimum expected update period to the VEA.

53. A system as claimed in claim 51, wherein the processor executes the VEA to call a function to cause the ERO to accept predetermined offset data indicative of the translation required to translate the ERO from ERO space to VEA space.

54. A system as claimed in claim 51, wherein the processor executes the VEA to call a function to allow the ERO to register a predetermined update scheme with the VEA.

55. A system as claimed in claim 54, wherein the ERO is inert and requests no update from the VEA.

56. A system as claimed in claim 54, wherein the ERO is self-generating and the predetermined update scheme registered with the VEA by the ERO makes a request to the VEA for periodic update of the ERO's state.

57. A system as claimed in claim 39, wherein the system includes:
an external controller coupled to the processor, the external controller coupled to receive a request for update of the ERO's state generated by an external controller of the ERO.

58. A system as claimed in claim 57, wherein the external controller is included within a remotely operated vehicle (ROV).

59. A system as claimed in claim 39, wherein the processor executes the VEA to call at least one drawing function of the ERO to cause the ERO to generate ERO data used by the processor to render the ERO in the graphical view.

60. A system as claimed in claim 39, wherein the processor executes the VEA to call a function supplied to the ERO to cause the ERO to initialize an external controller to the ERO.

61. A system as claimed in claim 39, wherein the processor executes the ERO to generate graphical view data of the ERO to permit the ERO to alter its geometry and behavior.

62. A system as claimed in claim 39, wherein the VEA calls a function to cause the ERO to indicate to the VEA whether the ERO will update itself on the current update cycle performed by the processor.

63. A system as claimed in claim 39, wherein the VEA calls a function to set the bulk attitude transformation matrix data in the ERO.

64. A system as claimed in claim 39, wherein the processor executes the VEA to call a function to cause the ERO to supply the VEA with clipping parameter data of a surface enclosing the ERO object.

65. A system as claimed in claim 64, wherein the clipping parameter data includes clipping envelope location data generated by the ERO to indicate the location of the ERO's clipping envelope in the graphical view.

66. A system as claimed in claim 64, wherein the clipping parameter data includes the clipping envelope orientation.

67. A system as claimed in claim 39, wherein the processor executes the ERO to generate ERO position data supplied to the VEA to position the ERO in the graphical view.

68. A system as claimed in claim 39, wherein the processor executes the ERO to generate ERO orientation data supplied to the VEA to position the ERO in the graphical view.

69. A method comprising the steps of:
a) dynamically linking an externally-rendered object (ERO) defining its own appearance and behavior to a virtual environment application (VEA) using a processor coupled to the memory;
b) receiving input data from an input device coupled to the processor;
c) if input data is received from the input device, generating transformation data based on the input data;
d) rendering VEA object data based on the transformation data;
e) rendering ERO data based on the transformation data, said steps (d) and (e) generating a graphical view of the VEA object and ERO on a display, the graphical view generated by said steps (d) and (e) presenting the appearance and independently of the VEA behavior of the ERO.

70. A method as claimed in claim 69, further comprising the step of:
f) requesting an update from the ERO to the VEA, and performing said step (e) based on said step (f).

71. A method as claimed in claim 70, wherein said step (f) is performed in response to an update request supplied to the ERO by an external controller coupled to the processor.

72. A method as claimed in claim 70, further comprising the step of:
f) requesting an update of ERO data from the VEA to the ERO periodically upon elapse of a predetermined update period.

* * * * *